United States Patent
Bress et al.

(10) Patent No.: US 7,584,334 B2
(45) Date of Patent: Sep. 1, 2009

(54) SYSTEMS AND METHODS FOR AN IMPROVED TAILGATE DEVICE

(76) Inventors: Steven Bress, 17917 Wheatridge Dr., Germantown, MD (US) 20874; Dan Bress, 17917 Wheatridge Dr., Germantown, MD (US) 20874; Mark Joseph Mernz, 114 Rawlings Ct., Folsom, CA (US) 95630

( * ) Notice: Subject to any disclaimer, the term of this patent is extended or adjusted under 35 U.S.C. 154(b) by 422 days.

(21) Appl. No.: 11/056,046

(22) Filed: Feb. 11, 2005

(65) Prior Publication Data

US 2005/0182510 A1 Aug. 18, 2005

Related U.S. Application Data

(60) Provisional application No. 60/544,858, filed on Feb. 13, 2004.

(51) Int. Cl.
*G06F 13/10* (2006.01)
*G06F 13/12* (2006.01)

(52) U.S. Cl. ................... 711/154; 711/156

(58) Field of Classification Search .......... 711/154, 711/156
See application file for complete search history.

(56) References Cited

U.S. PATENT DOCUMENTS 6,115,771 A * 9/2000 Born .................. 710/315
6,862,643 B2 * 3/2005 Wu et al. ............ 710/302
7,076,580 B2 * 7/2006 Nakano .............. 710/65
2004/0250055 A1 * 12/2004 Flanigan ............ 713/1

OTHER PUBLICATIONS

Hanmann, Jonathan "Information Technology- 1394 to AT Attachment Tailgate T13-1248D" Oct. 28, 1997, Revision 5, Pages: All.*
McLean Pete "Mandatory Identify Device and Identify Packet Device fields" Jan. 25, 2001, Pages: All.*
IOI, FW-i345MR-WP, Retrieved Apr. 15, 2009, http://lib.store.yahoo.net/lib/cooldrives/IDE345.pdf.*
Lyle, James "A strategy for testing hardware write block devices" Jul. 11, 2006 Digital Investigation vol. 3, Supplement 1, Sep. 2006, pp. 3-9 The Proceedings of the 6th Annual Digital Forensic Research Workshop (DFRWS '06).*
Axelson, Jan "The Mass Storage FAQ", Retrieved Apr. 15, 2009, http://www.lvr.com/mass_storage_faq.htm.*

* cited by examiner

*Primary Examiner*—Hyung S Sough
*Assistant Examiner*—Kenneth M Lo

(57) ABSTRACT

An improved tailgate device allows a host to have full access to a long-term storage device when the drive interface on the host and the drive interface on the storage device are of different types. An improved tailgate device is placed between the host and the storage device. A second host may be connected to the improved tailgate device. Commands from the first host are interpreted as industry standard Tailgate commands. Commands from the second host are not restricted to industry standard commands. Any data returned by a command is returned to the Host that issued the command.

8 Claims, 8 Drawing Sheets

SYSTEMS AND METHODS FOR AN IMPROVED TAILGATE DEVICE

RELATED APPLICATION

This application claims priority under 35 U.S.C. § 119 based on U.S. Provisional Application No. 60/544,858, filed Feb. 13, 2004, the disclosure of which is incorporated herein by reference.

BACKGROUND OF THE INVENTION

A. Field of the Invention

The present invention relates to computer memory devices and, more specifically, to mechanisms for accessing a drive controller's full instruction set when it is attached to a tailgate device.

B. Description of Related Art

Figure 1:
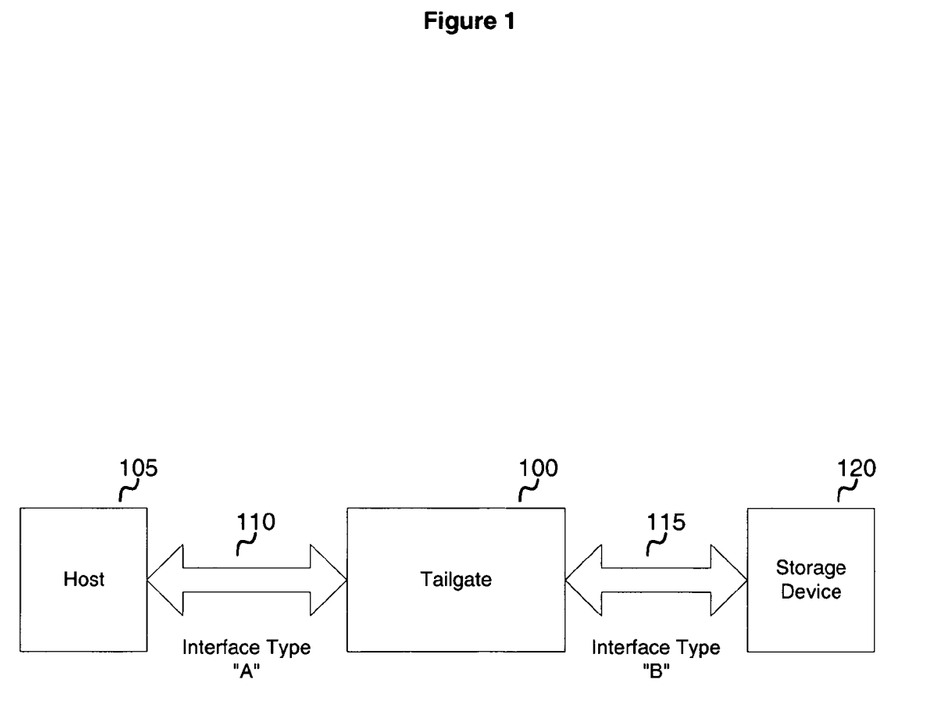
FIG. 1 is a block diagram illustrating a tailgate device.

There are many situations where it is desirable for a host computer to read data from a long-term memory storage device, such as a hard drive. There are a number of different drive interfaces, such as USB, IDE and FireWire, among others. There are occasions when the host does not have a matching interface for the device to be read. In this case, a tailgate device is used. A tailgate device is a device with two different interfaces, such as USB and IDE. FIG. 1 is a diagram illustrating a tailgate device in use. Host 105 is connected to Tailgate 100 through interface 110. Tailgate device 100 is connected to storage device 120 through interface 115. Interface 110 and interface 115 may be of different types.

Different interfaces have different command sets. For example the USB command set does not support the IDE Host Protected Area (HPA) command set. Therefore, if interface 110 is USB and interface 115 is IDE, there is no way known in the art for host 105 to issue an HPA command to storage device 120. If the host cannot issue HPA commands then the host may not have full access to the storage device. There is an obvious benefit for a host using a tailgate device to have access to hidden or protected areas on a storage device.

In addition to different interfaces having different command sets, they also treat drives differently. The last few sectors of an IDE drive may not be able to be read under Microsoft Windows if the drive is connected to a USB tailgate device. Further, Windows may not even know that it does not have access to all of the sectors on the drive. There is an obvious benefit for a host using a tailgate device to have access to all sectors on a storage device.

The above discussion has focused on IDE and USB interfaces, but our invention is not limited to these. One skilled in the art will appreciate that other drive types such as SCSI and FireWire have similar concerns.

Accordingly, there is a need in the art for an improved mechanism to enable a tailgate device to have full access to a long-term storage device.

SUMMARY OF THE INVENTION

The utility of a tailgate device is obviously enhanced by the capability to have full access to a long-term storage device.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description of the invention refers to the accompanying drawings. The same reference numbers in different drawings identify the same or similar elements. Also, the following detailed description does not limit the invention.

An improved tailgate device is described herein that that enables a host to have full access to a long-term memory storage device. The improved tailgate device has an interface port through which it can communicate with a long-term memory storage device.

The improved tailgate device may be connected to any type of long-term non-volatile memory device. For example, the storage device may be a hard disk drive or compact flash memory. In one implementation, the storage device uses an Integrated Drive Electronics (IDE) interface. An IDE interface is a well-known electronic interface that is frequently used to connect a computer's motherboard and disk drive. In IDE drives, the disk drive controller is built into the physical case of the disk drive. The IDE interface provides a relatively high level interface between the motherboard and the disk drive.

Although concepts consistent with the present invention are primarily described herein in relation to an IDE magnetic hard disk drive, these concepts may be implemented with other types of IDE media, such as flash memory with an IDE interface. Flash memories are a special type of semiconductor random access memory that retains its data after power has been removed from the system. Other types of media useable with an IDE interface include magnetic tape and optical media, such as a compact disc (CD) and a digital versatile disc (DVD). In addition to the IDE interface, concepts consistent with the invention may be applied in a straightforward manner to other types of storage interfaces, such as the well-known Small Computer System Interface (SCSI) standard, or IEEE 1394 FireWire interface.

For the sake of clarity, the remaining description herein will be described with reference to an IDE magnetic hard drive, although, as mentioned above, the concepts of the invention are not limited to such drives. One skilled in the art would appreciate that other modern long-term storage device interfaces share similar functionality that could be incorporated into the concepts described herein.

Unimproved Tailgate Device

FIG. 1 is a diagram illustrating a standard tailgate device. Host computer 105 is connected to Tailgate 100 through interface 110. Tailgate device 100 is connected to storage device 120 through interface 115. Interface 110 and interface 115 may be of different types. For this example, Interface type "A" could be USB and Interface type "B" could be IDE.

As described earlier, the tailgate device shown in FIG. 1 has a limitation in that not all of the commands that are available to the IDE interface 115 are defined in the USB interface 110. This is by design. By limiting the feature set supported by tailgate devices, they are both simpler to manufacture and allow for the use of a common driver. (See American National Standard for Information Systems—Information Technology—1394 to AT Attachment—Tailgate—T13/1248D revision 4.)

Improved Tailgate Device

Two Interfaces to Host, The Preferred Embodiment

Figure 2:
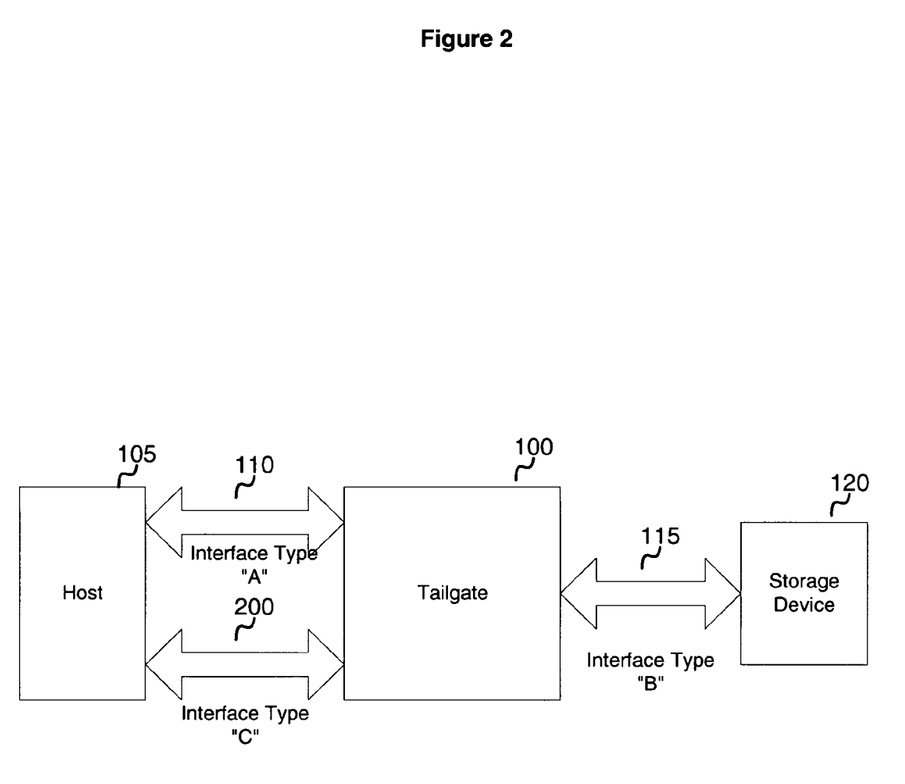
FIG. 2 is a block diagram illustrating an improved tailgate device with two interfaces between the tailgate device and host.

FIG. 2 illustrates an improvement to the standard tailgate from FIG. 1. In this case, an additional interface 200 is added to the tailgate device for communication with the host. For this example, Interface type "A" will be USB, Interface type "B" will be IDE, and Interface type "C" will be USB. Interface 200, when combined with the appropriate firmware in the tailgate device, allows the host 105 to communicate with the storage device 120 in ways that are not supported through the tailgate's native host interface 110. An example of this is the IDENTIFY DEVICE command that is used by an IDE device to detail all of its capabilities. In an unimproved tailgate device, only a small subset of this information is transferred through the standard host interface 110. The improved tailgate device would be able to request the IDENTIFY DEVICE packet for the drive 120 from the tailgate device 100 over the additional interface 200.

It is true that the designer of the tailgate device could use interface 110 in a more generalized way, and implement a method for passing any type of desired command to the storage device 120. By doing so, however the designer of the tailgate device would be required to have the user install special drivers on the host, instead of relying on the standard drivers supplied by the operating system. Our method is an improvement over this case, in that no special drivers are required to operate our tailgate device. This makes our improved tailgate device operating system transparent.

Single Interface to Host

Should a single interface to host device be required, the preferred embodiment would be a compound device. Compound devices present themselves as two or more devices to the operating system, and each may have its own drivers. Referring to FIG. 2, one of these devices functions as Interface "A" 110, and the other as Interface "C" 200. The installation process for a compound device is complex, and does not offer the flexibility of separate ports, but in cases involving portable systems with limited I/O ports, it may be desirable.

Wikipedia (http://en.wikipedia.org/wiki/USB mass storage device class) says: "The mass storage interface is an attractive option for many devices, such as cameras and media players, which are nonetheless capable of more functionality than being simple data repositories. By presenting themselves as simple datastores, these devices can leverage the high degree of support for the USB mass-storage device class in current operating systems' USB driver stacks and allow easy read and write access to their internal memories. The downside of doing so is that it prevents the device from easily presenting its actual functional behaviour across the USB interface too. For example, the makers of a digital still camera would also like it to implement the USB still-picture device class, allowing it to be controlled by image capture software."

"In theory a given USB device can implement any number of USB device-class interfaces simultaneously, becoming what the USB specification calls a "compound device". Being a compound device necessitates the device implement the internal functionality of a USB hub as well as two (or more) specific device interfaces. In practice this has proven to be too much of an overhead for resource and cost constrained embedded device controllers. Some USB digital cameras feature a switch allowing them to appear either as a mass-storage device or as a still-picture device, but they cannot be both at the same time. It is likely that as development of USB controller chips advances this constraint will evaporate."

The Preferred Embodiment

Figure 8:
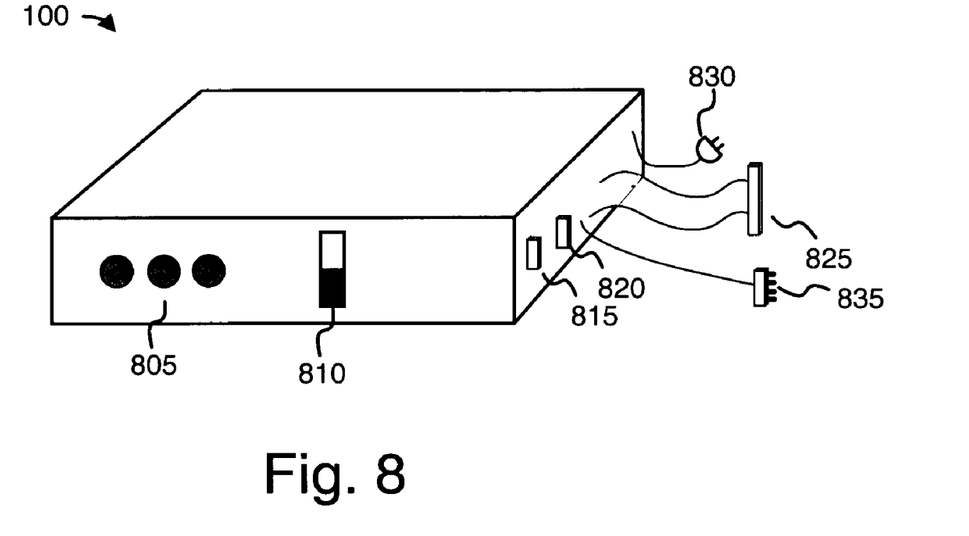
FIG. 8 is a diagram of an external view of one implementation of an improved tailgate device consistent with our current invention.

FIG. 8 is a drawing showing an external view of one iteration of an improved tailgate device. A user begins by plugging power cord 830 into a power socket. A user then ensures that the device is off, switch 810. A user would then attach an IDE storage device using IDE connector 825 and power supply connector 835. A user then connects a host to the device using USB interfaces 815 and 820. When switch 810 is turned on, the device functions as described above. LEDs 805 indicate storage device status to a user.

Improved Tailgate Device with Two Hosts

Figure 3:
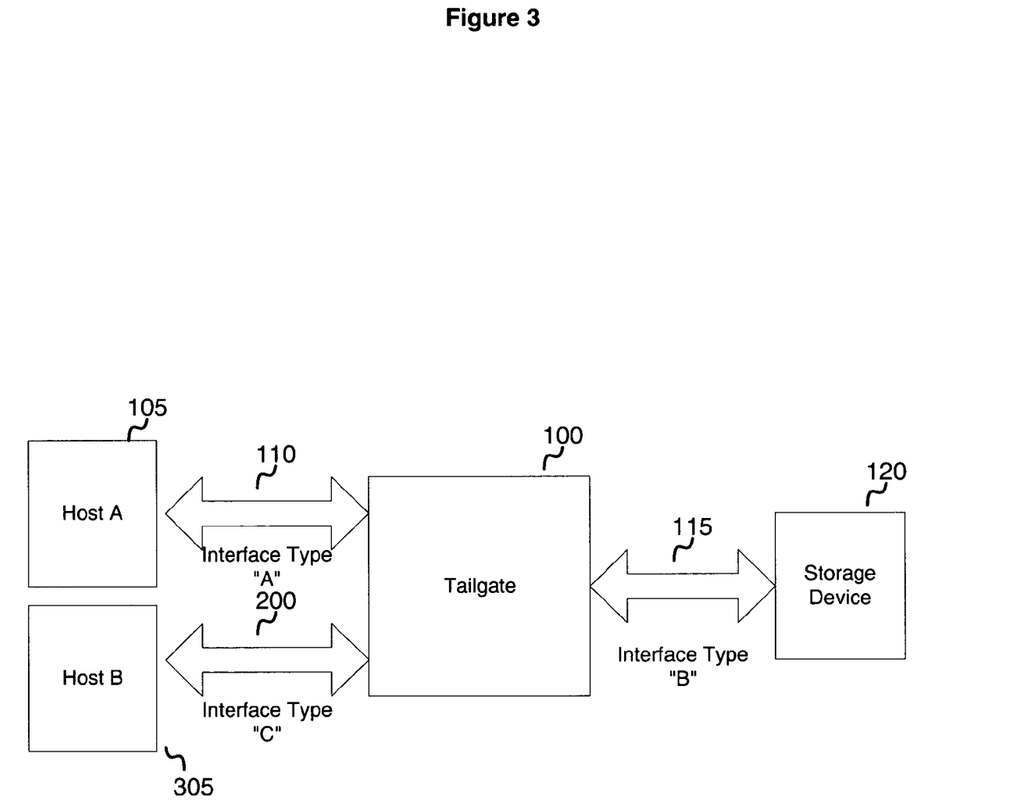
FIG. 3 is a block diagram illustrating another iteration of an improved tailgate device connected to two hosts.

FIG. 3 is a block diagram illustrating another iteration of an improved tailgate device. This iteration illustrates an improved tailgate device connected to two hosts. In this case, Host A 105 is connected to the tailgate 100 through Interface type "A". From the point of view of Host A, the tailgate device appears to be a normal tailgate device and provides access to Storage device 120. Host B is connected through the additional interface 200. Through this interface, Host B may interrogate the drive 120, make changes to the drive controller's settings, or even access data. Since additional interface 200 is not restricted to the command set supported by the Operating System's drivers, tailgate device 100 may offer support for any desired type of function or command.

Improved Tailgate Device with Multiple Ports

Figure 4:
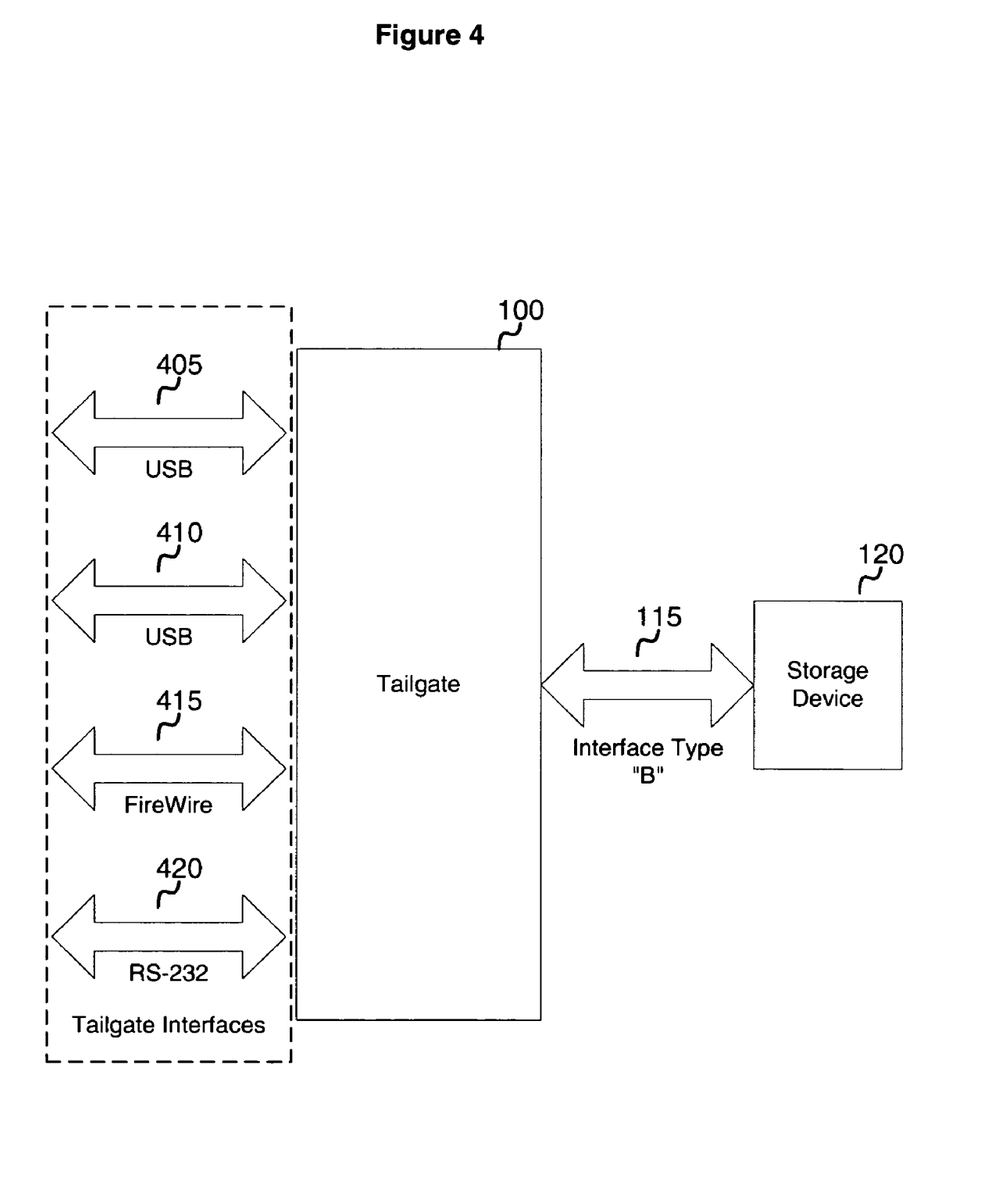
FIG. 4 is a block diagram illustrating another iteration of an improved tailgate device with multiple ports.

FIG. 4 is a block diagram illustrating another iteration of an improved tailgate device. In this case, the tailgate device has multiple host interface ports. This allows one improved tailgate device to be used by various computers that may be configured differently. That is, one computer may have two USB interfaces, while another computer may have one Firewire and an RS-232 interface. There is an obvious benefit to this added versatility.

Detailed Description of a Blocking Device

Figure 5:
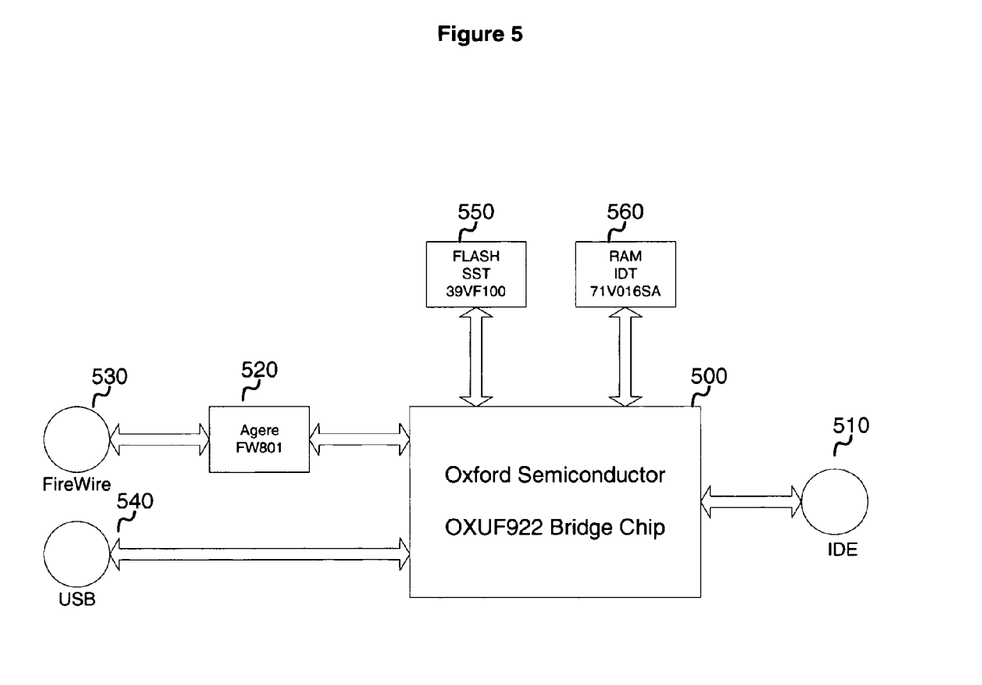
FIG. 5 is a block diagram illustrating a blocking device, which would be improved by our current invention.

FIG. 5 is a block diagram illustrating a blocking device, which would be improved by our current invention. A tailgate based blocking device is a special case of a class of devices known as write blockers. Write blockers are used heavily for digital forensics work, as they prevent unintentional changes to a storage device. A properly designed write blocker will prevent not only write commands from reaching the storage devices, but other commands that can modify the data as well. An example of such a command would be the command that causes an IDE drive to be formatted.

In this case, the write blocker is implemented using a standard, commercially available chip designed to be a tailgate device. For this example, the Oxford Semiconductor OXUF922 chip 500 is used, manufactured by Oxford Semiconductor LTD, United Kingdom. The OXUF922 chip provides a native USB 540 interface and an IDE interface 510, allowing it to be used as a USB to IDE tailgate device. It also has an interface to a FireWire PHY chip 520, in this case the Agere FW801. This chip translates the signals from OXUF922 500 into the appropriate signals for a FireWire interface 530. The OXUF922 500 only allows one host to be connected at a time, so it can either perform the function of a USB to IDE tailgate or a FireWire to IDE tailgate, but not both simultaneously.

Also attached to the OXUF922 500 chip is a FLASH chip 550 that provides non-volatile storage for program memory.

In normal operation, the OXUF922 translates commands from the FireWire or USB port into appropriate IDE commands. When modified to be a write blocker, a firmware change is required that allows commands that request data from the storage device 510 to be processed normally, while preventing any commands that would cause a change to the data on the storage device 510 from making such changes. In the preferred embodiment, this is done in such a way as to be operating system transparent.

While it is important to be operating system transparent from the point of view of system stability and ease of use, there are times when it is necessary to have additional access to the storage device than is available through standard tailgate interfaces such as FireWire and USB.

The ideal solution would be to simply use a native write blocker for the storage device, such as an IDE write blocker for an IDE drive. However, this is not always possible. It is quite normal for a parole officer to want to examine the contents of a parolee's drive at the parolee's residence. In order to do this, the parole officer is most likely to use a laptop computer to do the examination. So as not to make a change to the parolee's drive, some form of a write blocker must be used. While virtually all modern laptop computers have a USB port that could connect to a tailgate device, very few have an IDE port that could be used.

Detailed Description of a Blocking Device using an Improved Tailgate Device

Figure 6:
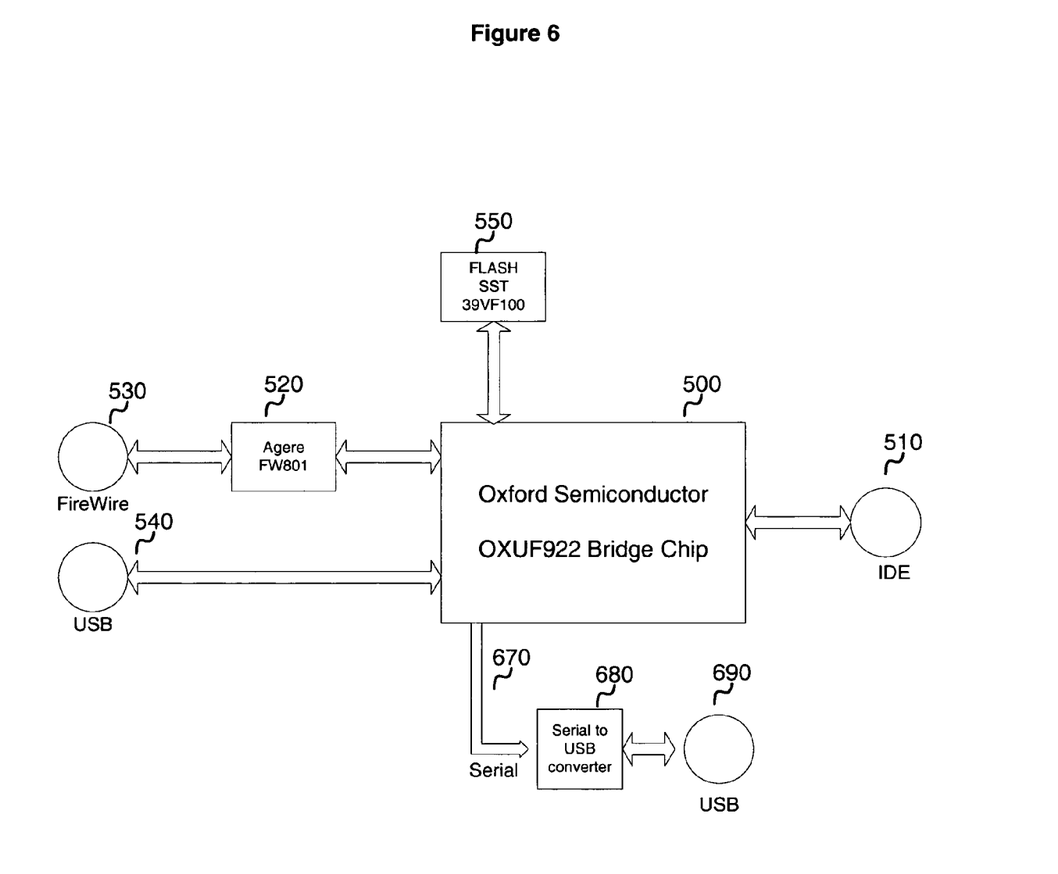
FIG. 6 is a block diagram illustrating a blocking device in more detail.

Our improvement to the standard tailgate device of FIG. 5 is shown in FIG. 6. In this case a serial to USB converter 680 is used to translate data to and from USB port 690 into serial data that may be used by the serial port in the OXUF922. A firmware modification is made to the standard write blocker version of the tailgate as shown in FIG. 5 and stored in FLASH memory 550. The new firmware allows the OXUF922 to process commands from USB port 690. These commands can include, but are not limited to, retrieving the IDENTIFY DEVICE data from the storage device 510, setting or changing the HPA thereby allowing the entire drive to be examined, and even reading sectors of data that might otherwise be unavailable through the tailgate device's normal interfaces 530 and 540.

Improved Tailgate Device with a User Activated Switch

Figure 7:
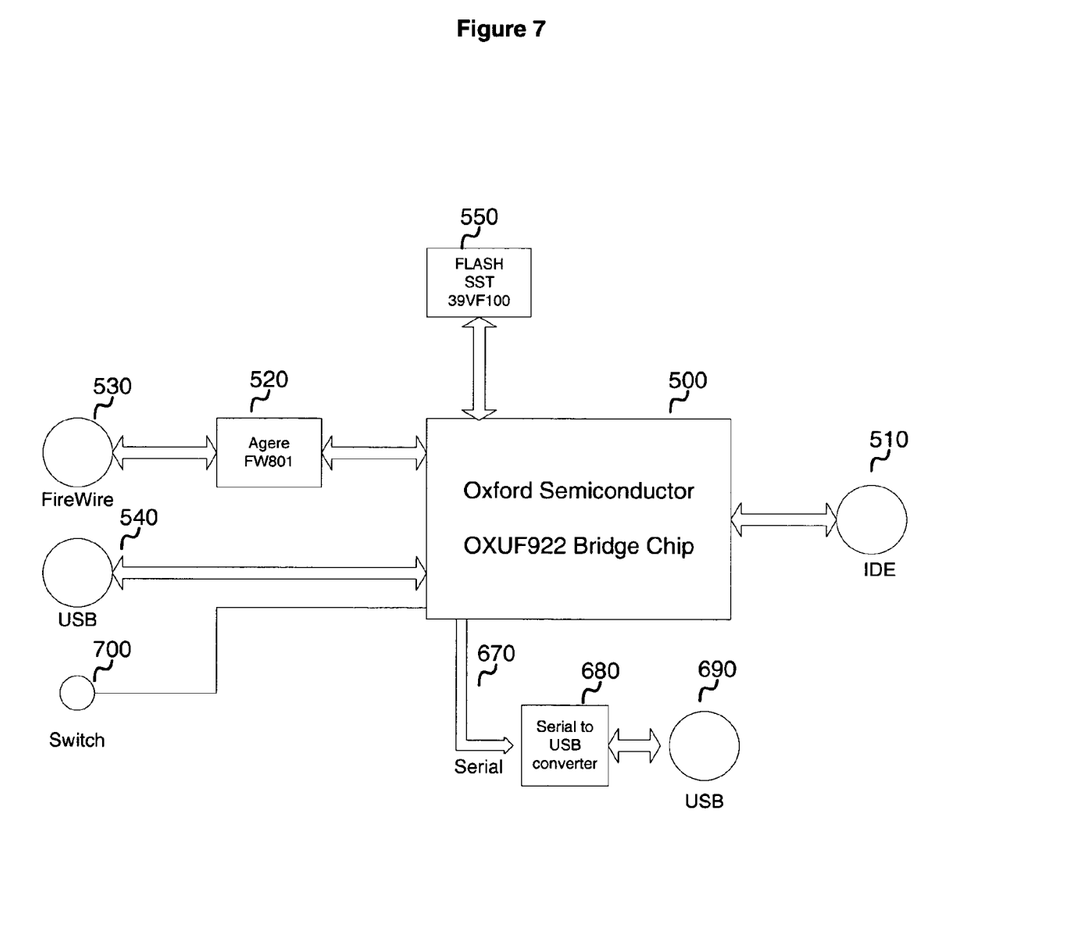
FIG. 7 is a block diagram illustrating a blocking device with a user-controlled switch.

FIG. 7 Illustrates a version of a blocking tailgate device 500 with the addition of user controlled switch 700. This switch may be used to instruct the tailgate device 500 to issue an address offset command to the storage device 510. Issuing this command to a storage device that has a host protected mode area set will swap the hidden area with the non-hidden one.

In another embodiment, switch 700 may be used to instruct the tailgate device to restore a storage device's controlling to a previous setting. This is useful for the case where it is necessary to change a DEVICE CONFIGURATION OVERLAY setting in a storage device's controller in order to access hidden data on the storage device. Since this command makes a permanent change to a setting in the storage device's controller, it is important to have a way to change this setting back. While this could be done under computer control, it is also convenient to have a simple interface, such as a switch, for indicating that this setting should be changed or restored. A simple indicator, such as an LED, may be used to show state of the storage controller's DEVICE CONFIGURATION OVERLAY setting.

Improved Tailgate Device with Encoded Commands

While the preferred embodiment of our tailgate enhancement makes use of an additional communication port on the tailgate chip, this would unnecessarily limit our invention to those tailgate chips with an additional communication port. For those tailgate devices that do not have an extra communications port, another embodiment allows for communications with the tailgate device through the existing host interface port.

Since, by definition, the communication protocol between the host and the tailgate does not support issuing the desired command directly, a method must be put in place to allow the tailgate device to interpret one or more standard commands as a different command type. For instance, the data returned by a FireWire tailgate in response to a query about drive details does not return all of the information about an IDE drive that a true IDENTIFY DEVICE command would. So to get a drive's full IDENTIFY DEVICE information a true IDE command must be issued.

One obvious method would be to request data from a sector that doesn't exist and have the tailgate device return the IDENTIFY DEVICE data as if it were the data from the (non-existent) sector. The problem with this idea is that there is no guarantee that the host operating system will even bother to pass along such a request, as the host may know that the sector doesn't exist. To change this behavior would require a device driver change in the host operating system, which conflicts with the goal of operating system transparency for our improved tailgate device.

If the tailgate device were known to be a blocking device, one could safely encode a command to the tailgate device in one or more write commands. This would work in that the blocking tailgate device is designed to prevent any data that would be written to the drive from being written to the drive. There are two drawbacks to this concept. The first is that in some blocking devices, the blocking is done is such a way as to convince the host operating system that the tailgate device is a read-only device, and the write command would never be issued to the tailgate device. The other drawback is that it is always best not to try to write to a storage device connected to a blocking device, as many of these devices have unknown failure modes. A failure in blocking would have the undesired consequence of writing to the drive.

A less obvious method that would work with any operating system would be to encode the command in a series of commands sent to the tailgate device. For example, if the tailgate device were to record the sector number of each read request, it would be possible to determine if a specific pattern of read requests were issued. For the case of the IDENTIFY DEVICE information, should this pattern be detected, a subsequent one sector read would cause the tailgate device to return the desired information about the storage device.

An example of this type of pattern for an IDENTIFY DEVICE would be as follows:

Read sector 72
Read sector 100000
Read sector 69
Read sector 2100000
Read sector 76
Read sector 5100000
Read sector 76
Read sector 6100000
Read sector 79
Read sector 0

The last read sector would instruct the improved tailgate device to send a command to the storage device, such as to return the IDENTIFY DEVICE information.

To be effective, the read pattern should be such that it is not likely to be encountered during the normal operation of the tailgate device. This would typically be a rather long sequence, as the longer the sequence, the lower the odds of accidentally triggering a command. Each different command that the tailgate would be expected to carry out could have its own unique sequence.

Some commands require that proper parameters be specified in order to properly carry them out. This additional information may be encoded along with the command encoding sequence described above. A simple example would be to monitor the number of sectors to be read for each command in the command sequence, and store this information for later use. Should a valid command sequence be detected, the properties for the desired command would already be in local memory. For a very complicated command, this could require more than 512 bytes of storage. In this example, getting that many parameters would require more than 512 steps in the sequence.

This fits in well with the idea of having a long command sequence. However, if there were to be a desire to shorten the command sequence, data could be saved from some of the lower address bits of the sector read command. Using just the lower 8 bits would cut the number of sequence steps required to around 256. This is fairly safe to do in that there are few storage devices that store less than 256 sectors. In reality, it would be fairly safe to use even more of the address bits for encoding data, but that would be up to the comfort level of the individual designer.

The reason that this is not the preferred embodiment is that despite the best efforts to come up with a command sequence that would never happen during the normal operation of the tailgate device, there is no guarantee that this would not happen. Should the command sequence be unexpectedly triggered, at best the wrong data could be returned, and at worst the storage device could be put into an unknown state. In spite of these concerns, due to differences between chips designed for tailgate devices, this may be the only viable option.

SUMMARY

As described above, an improved tailgate device is physically connected to a storage device. The improved tailgate device issues commands to allow full access to a long-term memory storage device. An embedded processor within the improved tailgate device controls functionality of the tailgate device. The functionality of the embedded processor can be programmatically modified to allow for a number of different possible options.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

Please refer to FIG. 1. It will be apparent to one of ordinary skill in the art that the discussions about full drive access and such similar terms refer to; host 105 having access to storage device 120 as if host 105 had the same interface type as the storage device.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The foregoing description of preferred embodiments of the present invention uses the term "processor", but this term is not intended to limit the invention to a precise form. One skilled in the art will appreciate that a processor may also be described as; circuitry and logic algorithms.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. An improved tailgate device comprising:
   a storage interface;
   a primary interface;
   a secondary interface;
   logic and circuitry coupled to the storage interface, primary interface and the secondary interface;
   wherein both the primary interface and the secondary interface are not the same interface type as the storage interface;
   wherein the storage interface is coupled to a storage device, comprising a controller;
   wherein a first host, connected to the primary interface, communicates with the storage device in a manner that is transparent to an operating system (OS) of the first host, using a first set of commands;
   said first set of commands are Tailgate commands, where the Tailgate commands are for communicating between the primary interface and the storage interface and are a subset of said storage device's command set;
   wherein a second host, connected to secondary interface, issues said Tailgate commands and a second set of commands to the storage device transparent to the operating system of the first host, wherein the second set of commands comprise: IDENTIFY DEVICE, commands for setting or changing the Host Protection Area (HPA) thereby allowing the entire drive to be examined, commands for reading sectors of data that are unavailable through the primary interface, and commands for modifying a DEVICE CONFIGURATION OVERLAY setting in the controller in order to access hidden data on the storage device;

wherein the storage device's command set includes said second set of commands;

wherein the second set of commands do not comprise an equivalent command in the Tailgate commands; and wherein in response to a particular command, data returned by the storage device to the improved tailgate device, is sent to one of the first host or second host that issued the particular command.

2. The improved tailgate device of claim 1, further comprising: multiple secondary interfaces.

3. The improved tailgate device of claim 1, wherein the storage interface is an integrated device electronics (IDE) interface.

4. The improved tailgate device of claim 3, wherein the logic and circuitry issues commands to a storage device connected to the storage interface to obtain the drive size reported by the storage device's controller in the Identify Device Packet to allow the logic and circuitry to analyze the full size of the storage device and subsequently issue commands to change the drive size reported by the storage device's controller in the Identify Device Packet, to enable a host connected to the primary interface to read data from the entire drive.

5. The improved tailgate device of claim 3, wherein the logic and circuitry stores information on the original drive size reported by a storage device's controller in the Identify Device Packet of a storage device connected to the storage interface and, upon command, issues commands to restore the drive size reported by the storage device's controller in the Identify Device Packet, to its original state.

6. The improved tailgate device of claim 3, wherein the logic and circuitry, upon command, issues a command to switch Enable/Disable Address Offset Mode on a storage device connected to the storage interface.

7. The improved tailgate device of claim 3, wherein the logic and circuitry stores information on the original state of the Enable/Disable Address Offset Mode and, upon command, issues a command to restore the Enable/Disable Address Offset Mode to its original state on a storage device connected to the storage interface.

8. An improved tailgate device comprising:
a primary interface;
a storage interface;
logic and circuitry coupled to the storage interface and the primary interface;
wherein the primary interface is not the same interface type as the storage interface;
wherein the storage interface is coupled to a storage device, comprising a controller;
wherein a first host, connected to the primary interface, communicates with the storage device in a manner that is transparent to a operating system (OS) of the first host, using a first set of commands;
wherein said logic and circuitry analyzes said first set of commands;
said first set of commands comprise a set of encoded commands;
wherein each of said set of encoded commands comprise:
a specific pattern of a series of commands from the first set of commands, which when analyzed by said logic and circuitry, cause the logic and circuitry to issue one of a second set of commands to the storage device transparent to the operating system, wherein the second set of commands comprise: IDENTIFY DEVICE, commands for setting or changing the Host Protection Area (HPA) thereby allowing the entire drive to be examined, commands for reading sectors of data that are unavailable through the primary interface, and commands for modifying a DEVICE CONFIGURATION OVERLAY setting in the controller in order to access hidden data on the storage device.

* * * * *

UNITED STATES PATENT AND TRADEMARK OFFICE
Certificate

Patent No. 7,584,334 B2                                  Patented: September 1, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven Bress, Germantown, MD (US); and Mark Joseph Menz, Folsom, CA (US).

Signed and Sealed this Twentieth Day of September 2011.

*MANO PADMANABHAN*
*Supervisory Patent Examiner*
*Art Unit 2188*
*Technology Center 2100*